US008917647B2

(12) United States Patent
Nentwig

(10) Patent No.: US 8,917,647 B2
(45) Date of Patent: Dec. 23, 2014

(54) APPARATUS AND METHOD TO ALLOCATE COMMUNICATION RESOURCES IN A COMMUNICATION SYSTEM

(75) Inventor: Markus Nentwig, Helsinki (FI)

(73) Assignee: Nokia Corporation, Espoo (FI)

( * ) Notice: Subject to any disclaimer, the term of this patent is extended or adjusted under 35 U.S.C. 154(b) by 186 days.

(21) Appl. No.: 13/575,742

(22) PCT Filed: Feb. 11, 2010

(86) PCT No.: PCT/FI2010/050086
§ 371 (c)(1),
(2), (4) Date: Sep. 5, 2012

(87) PCT Pub. No.: WO2011/098655
PCT Pub. Date: Aug. 18, 2011

(65) Prior Publication Data
US 2013/0058288 A1    Mar. 7, 2013

(51) Int. Cl.
*H04H 20/71*    (2008.01)
*H04J 11/00*    (2006.01)
*H04W 52/24*   (2009.01)
*H04W 28/26*   (2009.01)
*H04W 28/04*   (2009.01)
*H04W 72/08*   (2009.01)

(52) U.S. Cl.
CPC ......... *H04W 52/245* (2013.01); *H04J 11/0023* (2013.01); *H04W 28/26* (2013.01); *H04W 28/04* (2013.01); *H04W 72/082* (2013.01)
USPC ...................................... 370/312; 455/114.2

(58) Field of Classification Search
USPC ..................... 370/329, 312, 114.2
See application file for complete search history.

(56) References Cited

U.S. PATENT DOCUMENTS

| 6,609,008 B1 | 8/2003 | Whang et al. |
| 2007/0104126 A1 | 5/2007 | Calhoun et al. |

(Continued)

FOREIGN PATENT DOCUMENTS

CN    1158678 A    9/1997

OTHER PUBLICATIONS

Jing et al., "Global Control Plane Architecture for Cognitive Radio Networks", IEEE International Conference on Communications, Jun. 24-28, 2007, pp. 6466-6470.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 8)", 3GPP TS 36.300, V8.5.0, May 2008, pp. 1-134.

(Continued)

*Primary Examiner* — Sai-Ming Chan
(74) *Attorney, Agent, or Firm* — Harrington & Smith

(57) ABSTRACT

An apparatus, system and method for providing interference cancellation and communication resource reservation limits to allocate communication resources in a communication system. In one embodiment, the apparatus includes a processor (1320) and memory (1350) including computer program code. The memory (1350) and the computer program code are configured, with the processor (1320), to cause the apparatus to identify an interval of received signal power levels for interference cancellation of an interfering signal to a primary signal, and generate a message that provides the interval of received signal power levels for the interference cancellation of the interfering signal to the primary signal. In a related embodiment, the memory (1350) and the computer program code are configured, with the processor (1320), to cause the apparatus to determine a communication resource reservation limit, and request an increase in the communication resource reservation limit.

20 Claims, 14 Drawing Sheets

(56) References Cited

U.S. PATENT DOCUMENTS

| | | |
|---|---|---|
| 2007/0153717 A1 | 7/2007 | Tervonen et al. |
| 2008/0187065 A1 | 8/2008 | Chang et al. |
| 2009/0129366 A1* | 5/2009 | Molisch et al. ............... 370/347 |
| 2011/0228837 A1 | 9/2011 | Nentwig |
| 2012/0287879 A1 | 11/2012 | Nentwig |

OTHER PUBLICATIONS

International Search Report and Written Opinion received for corresponding International Patent Application No. PCT/FI2010/050086, dated Nov. 17, 2010, 12 pages.

* cited by examiner

APPARATUS AND METHOD TO ALLOCATE COMMUNICATION RESOURCES IN A COMMUNICATION SYSTEM

RELATED APPLICATION

This application was originally filed as PCT application No. PCT/FI2010/050086 filed Feb. 11, 2010.

TECHNICAL FIELD

The present invention is directed, in general, to communication systems and, in particular, to an apparatus, system and method to employ interference cancellation and communication resource reservation limits to allocate communication resources in a communication system.

BACKGROUND

Long Term Evolution ("LTE") of the Third Generation Partnership Project ("3GPP"), also referred to as 3GPP LTE, refers to research and development involving the 3GPP Release 8 and beyond, which is the name generally used to describe an ongoing effort across the industry aimed at identifying technologies and capabilities that can improve systems such as the Universal Mobile Telecommunication System ("UMTS"). The goals of this broadly based project include improving communication efficiency, lowering costs, improving services, making use of new spectrum opportunities, and achieving better integration with other open standards. The 3GPP LTE project is not itself a standard-generating effort, but will result in new recommendations for standards for the UMTS. Further developments in these areas are also referred to as Long Term Evolution-Advanced ("LTE-A").

The evolved UMTS terrestrial radio access network ("E-UTRAN") in 3GPP includes base stations providing user plane (including packet data convergence protocol/radio link control/medium access control/physical ("PDCP/RLC/MAC/PHY") sublayers) and control plane (including radio resource control ("RRC") sublayer) protocol terminations towards wireless communication devices. A wireless communication device or terminal is generally known as user equipment ("UE") or a mobile station ("MS"). A base station is an entity of a communication network often referred to as a Node B or an NB. Particularly in the E-UTRAN, an "evolved" base station is referred to as an eNodeB or an eNB. For details about the overall architecture of the E-UTRAN, see 3GPP Technical Specification ("TS") 36.300, v8.5.0 (2008-05), which is incorporated herein by reference. The terms base station, NB, eNB and cell generally refer to equipment or a location that provides a wireless-network interface in a cellular communication system, and will be used interchangeably herein, and include communication systems such as cellular communication systems other than those designed under 3GPP standards.

The future wireless communication systems are expected to serve a large number of access points or nodes, such as low-power base stations, each serving a small number of wireless communication devices, and each providing high bit-rate, local-area coverage in a relatively small cell or location. Due to high density of communication system deployment, such as in high-density urban areas and in heavily attended public facilities such as sports stadiums, conventional network planning is impractical. Instead, nodes are expected to autonomously interact to share communication resources and thereby manage interference among user equipment using a flexible spectrum use ("FSU") protocol. The aforementioned practices are intended to provide "optimized local-area" coverage as a supplement to a communication system such as an LTE-based communication system.

Interference cancellation ("IC") is a process employed in a receiver (e.g., a wireless communication device) that can significantly improve overall reception performance in a communication system. When the resulting level of interference at a receiver is high such as in heavily attended public facilities, interference cancellation allows the receiver to decode an interfering signal and subtract the same from a received signal, thereby enabling reliable communication in communication channels of the communication system that may use overlapping assigned frequencies and time slots.

In view of the growing utilization of wireless communication devices and the importance of providing communication services to a large number thereof in a small serving area, it is important to provide such capability in a communication system with little impact to architecture thereof and with a reasonable capital investment. Therefore, what is needed in the art is an apparatus, system and method to share communication resources in a communication system without incurring substantial cost or performance degradation to the communication system including the wireless communication devices employed therein.

SUMMARY OF THE INVENTION

These and other problems are generally solved or circumvented, and technical advantages are generally achieved, by embodiments of the present invention, which include an apparatus, system and method for providing interference cancellation and communication resource reservation limits to allocate communication resources in a communication system. In one embodiment, the apparatus includes a processor and memory including computer program code. The memory and the computer program code are configured, with the processor, to cause the apparatus to identify an interval of received signal power levels for interference cancellation of an interfering signal to a primary signal, and generate a message that provides the interval of received signal power levels for the interference cancellation of the interfering signal to the primary signal. In a related embodiment, the memory and the computer program code are configured, with the processor, to cause the apparatus to determine a communication resource reservation limit, and request an increase in the communication resource reservation limit.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention. In view of the foregoing, the present invention will be described with respect to exemplary embodiments in a specific context of an apparatus, system and method to employ interference cancellation and communication resource reservation limits to enable efficient utilization of communication resources in a communication system. Although systems and methods described herein are described with reference to a 3GPP LTE cellular network, they can be applied to any wireless communication system including a Global System for Mobile Communications ("GSM") communication system, a Worldwide Interoperability for Microwave Access ("WiMax") communication system, or a Wi-Fi communication system.

Figure 1:
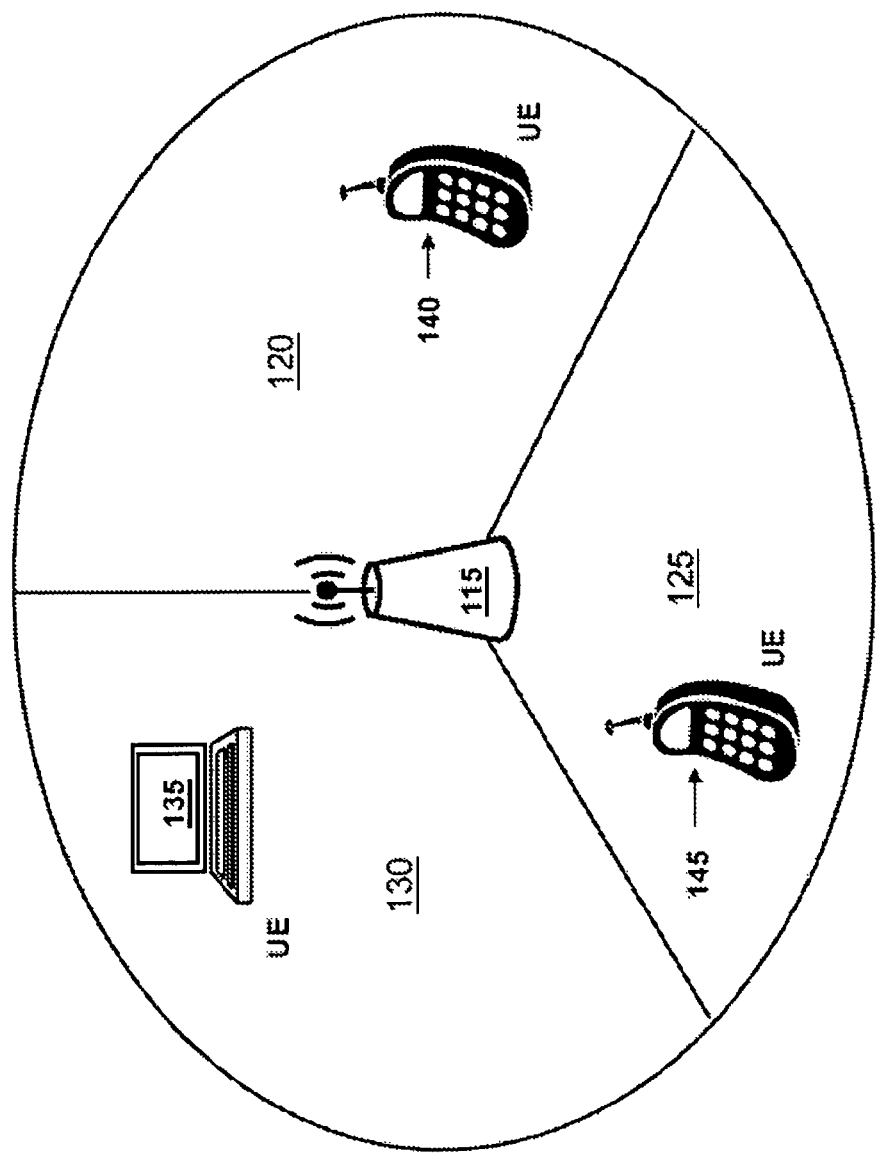
FIGS. 1 and 2 illustrate system level diagrams of embodiments of communication systems including a base station and wireless communication devices that provide an environment for application of the principles of the present invention.

Turning now to FIG. 1, illustrated is a system level diagram of an embodiment of a communication system including a base station 115 and wireless communication devices (e.g., user equipment) 135, 140, 145 that provides an environment for application of the principles of the present invention. The base station 115 is coupled to a public switched telephone network (not shown). The base station 115 is configured with a plurality of antennas to transmit and receive signals in a plurality of sectors including a first sector 120, a second sector 125, and a third sector 130, each of which typically spans 120 degrees. Although FIG. 1 illustrates one wireless communication device (e.g., wireless communication device 140) in each sector (e.g., the first sector 120), a sector (e.g., the first sector 120) may generally contain a plurality of wireless communication devices. In an alternative embodiment, a base station 115 may be formed with only one sector (e.g., the first sector 120), and multiple base stations may be constructed to transmit according to collaborative/cooperative multiple-input multiple-output ("C-MIMO") operation, etc. The sectors (e.g., the first sector 120) are formed by focusing and phasing radiated signals from the base station antennas, and separate antennas may be employed per sector (e.g., the first sector 120). The plurality of sectors 120, 125, 130 increases the number of subscriber stations (e.g., the wireless communication devices 135, 140, 145) that can simultaneously communicate with the base station 115 without the need to increase the utilized bandwidth by reduction of interference that results from focusing and phasing base station antennas.

Figure 2:
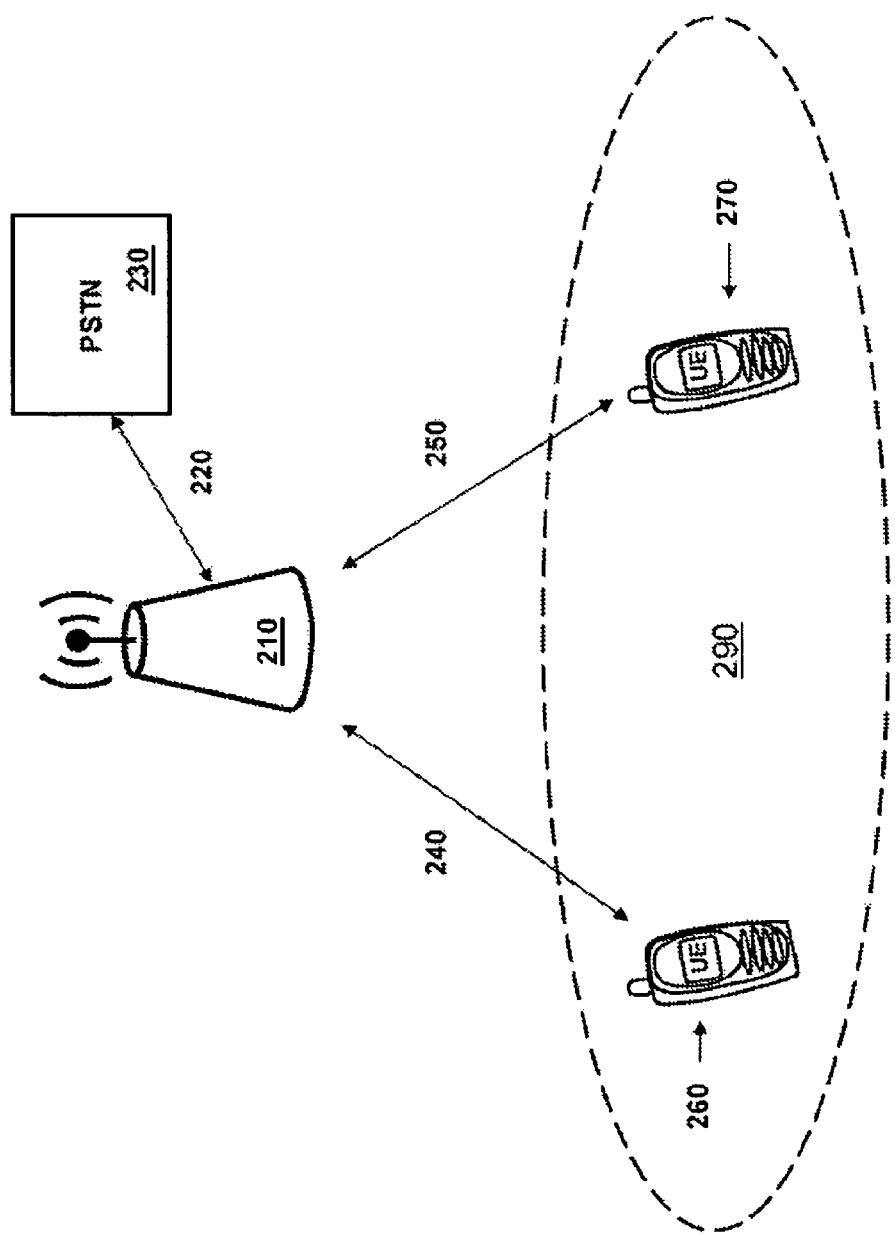

Turning now to FIG. 2, illustrated is a system level diagram of an embodiment of a communication system including a base station and wireless communication devices that provides an environment for application of the principles of the present invention. The communication system includes a base station 210 coupled by communication path or link 220 (e.g., by a fiber-optic communication path) to a core telecommunications network such as public switched telephone network ("PSTN") 230. The base station 210 is coupled by wireless communication paths or links 240, 250 to wireless communication devices 260, 270, respectively, that lie within its cellular area 290.

In operation of the communication system illustrated in FIG. 2, the base station 210 communicates with each wireless communication device 260, 270 through control and data communication resources allocated by the base station 210 over the communication paths 240, 250, respectively. The control and data communication resources may include frequency and time-slot communication resources in frequency division duplex ("FDD") and/or time division duplex ("TDD") communication modes.

Figure 3:
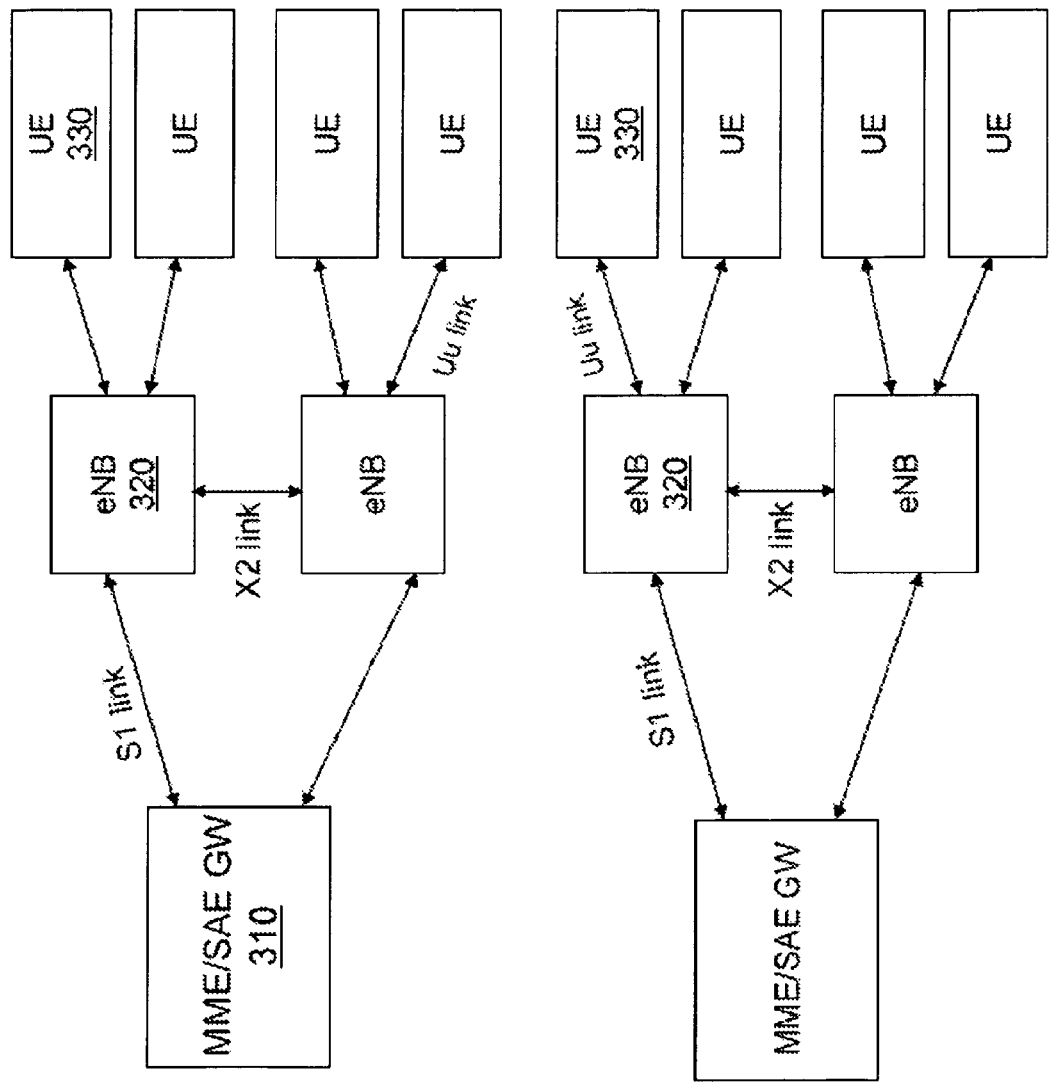
FIGS. 3 and 4 illustrate system level diagrams of embodiments of communication systems including a wireless communication systems that provide an environment for application of the principles of the present invention.

Turning now to FIG. 3, illustrated is a system level diagram of an embodiment of a communication system including a wireless communication system that provides an environment for the application of the principles of the present invention. The wireless communication system may be configured to provide evolved UMTS terrestrial radio access network ("E-UTRAN") universal mobile telecommunications services. A mobile management entity/system architecture evolution gateway ("MME/SAE GW," one of which is designated 310) provides control functionality for an E-UTRAN node B (designated "eNB," an "evolved node B," also referred to as a "base station," ones of which are designated 320) via an S1 communication link (ones of which are designated "S1 link"). The base stations 320 communicate via X2 communication links (designated "X2 link"). The various communication links are typically fiber, microwave, or other high-frequency metallic communication paths such as coaxial links, or combinations thereof.

The base stations 320 communicate with user equipment ("UE," ones of which are designated 330), which is typically a mobile transceiver carried by a user. Thus, communication links (designated "Uu" communication links, ones of which are designated "Uu link") coupling the base stations 320 to the user equipment 330 are air links employing a wireless communication signal such as, for example, an orthogonal frequency division multiplex ("OFDM") signal.

Figure 4:
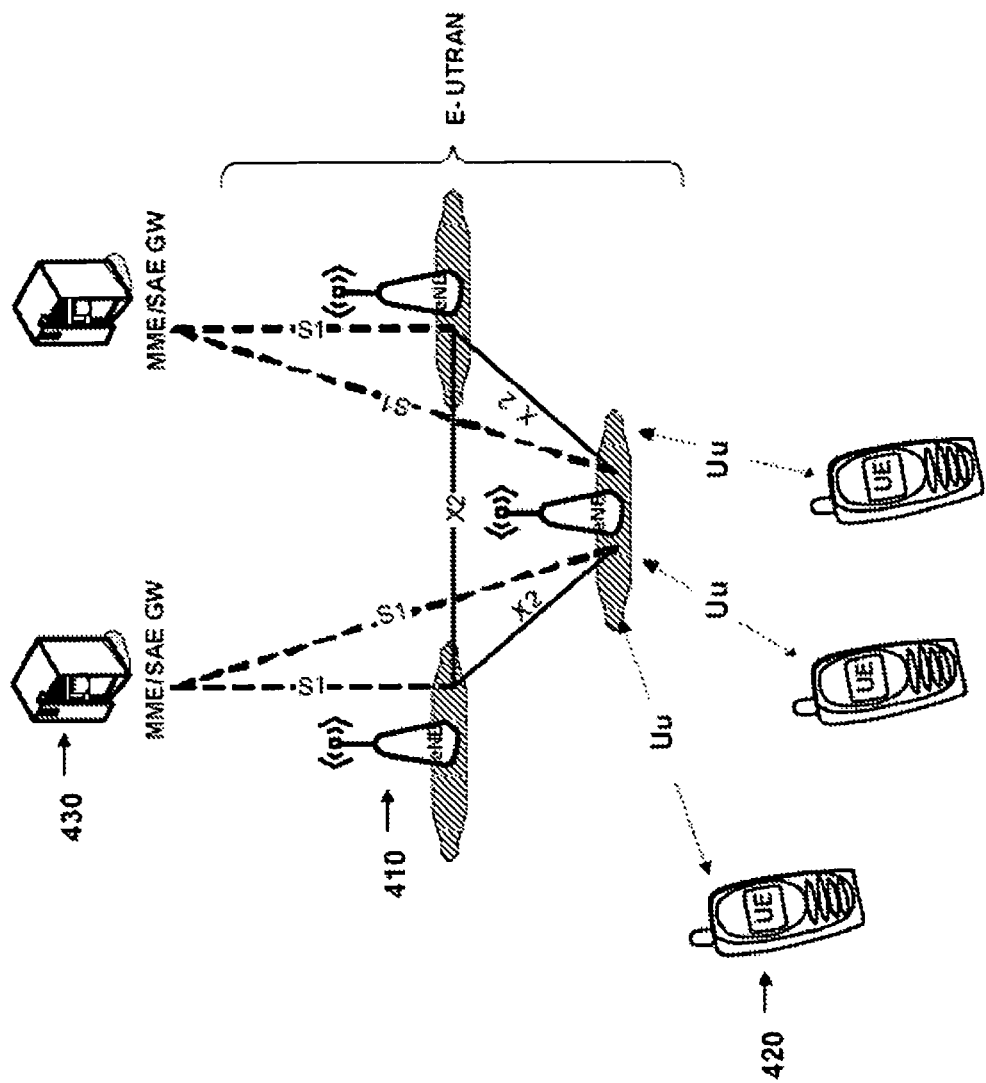

Turning now to FIG. 4, illustrated is a system level diagram of an embodiment of a communication system including a wireless communication system that provides an environment for the application of the principles of the present invention. The wireless communication system provides an E-UT-RAN architecture including base stations (one of which is designated 410) providing E-UTRAN user plane (payload data, packet data convergence protocol/radio link control/media access control/physical sublayers) and control plane (radio resource control sublayer) protocol terminations towards user equipment (one of which is designated 420). The base stations 410 are interconnected with X2 interfaces or communication links (designated "X2"). The base stations 410 are also connected by S1 interfaces or communication links (designated "S1") to an evolved packet core ("EPC") including a mobile management entity/system architecture evolution gateway ("MME/SAE GW," one of which is designated 430). The S1 interface supports a multiple entity relationship between the mobile management entity/system architecture evolution gateway 430 and the base stations 410. For applications supporting inter-public land mobile handover, inter-eNB active mode mobility is supported by the mobile management entity/system architecture evolution gateway 430 relocation via the S1 interface.

The base stations 410 may host functions such as communication (e.g., radio) resource management. For instance, the base stations 410 may perform functions such as internet protocol ("IP") header compression and encryption of user signal streams, ciphering of user signal streams, radio bearer control, radio admission control, connection mobility control, dynamic allocation of resources to user equipment in both the uplink and the downlink, selection of a mobility management entity at the user equipment attachment, routing of user plane (also referred to as "U-plane") data towards the user plane entity, scheduling and transmission of paging messages (originated from the mobility management entity), scheduling and transmission of broadcast information (originated from the mobility management entity or operations and maintenance), and measurement and reporting configuration for mobility and scheduling. The mobile management entity/system architecture evolution gateway 430 may host functions such as distribution of paging messages to the base stations 410, security control, termination of user plane packets for paging reasons, switching of user plane for support of the user equipment mobility, idle state mobility control, and system architecture evolution bearer control. The user equipment 420 receives an allocation of a group of information blocks from the base stations 410.

Figure 5:
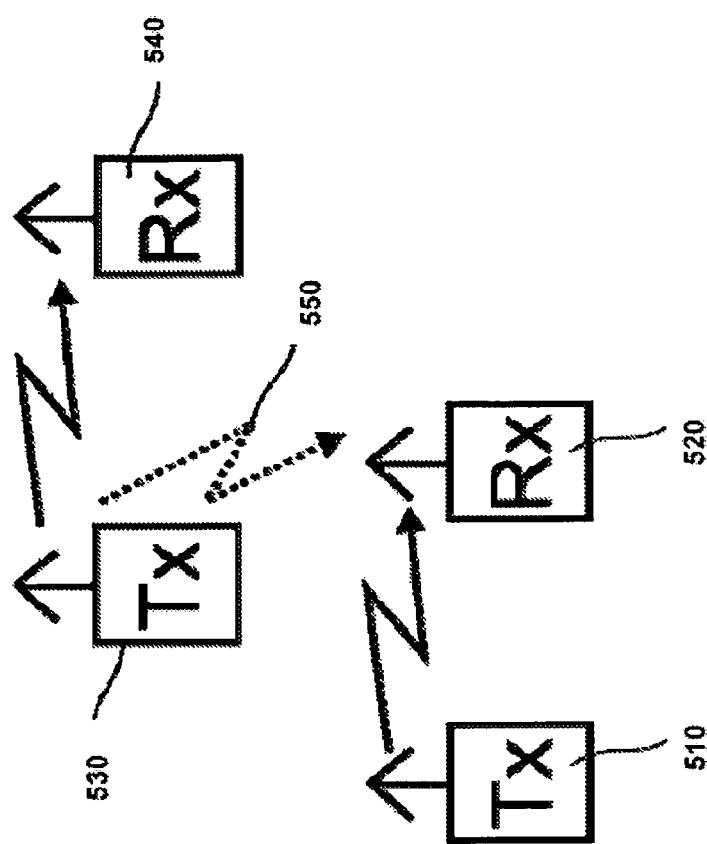
FIG. 5 illustrates a system level diagram of an embodiment of a communication system demonstrating the principle of interference cancellation that provides an environment for application of the principles of the present invention.

Turning now to FIG. 5, illustrated is a system level diagram of an embodiment of a communication system demonstrating the principle of interference cancellation that provides an environment for application of the principles of the present invention. Interference cancellation is a technique used in a receiver (e.g., a wireless communication device or a base station) wherein transmissions (e.g., an interfering or unwanted signal) from an interfering transmitter (e.g., another wireless communication device or base station) are decoded and removed from a received primary (wanted) signal, thereby improving decoding of the primary signal. The communication system includes a first transmitter 510 transmitting a communication signal (a primary signal) to a first receiver 520. The communication system includes a second transmitter 530 transmitting a communication signal to a second receiver 540. The signal (an interfering signal) from the second transmitter 530 causes interference at the first receiver 520 via an interference link 550 with common portions such as a shared communication resource. The first receiver 520 first decodes the interfering signal from the second transmitter 530, reconstructs the interfering signal, and subtracts the same from the received primary signal from the first transmitter 510. The first receiver 520 then decodes the weaker primary signal received from the first transmitter 510 after subtraction of the interfering signal. Depending on mobility of the transmitters and receivers and stability of a communication path therebetween, roughly 20 decibels ("dB") of interfering signal can be subtracted from the primary signal by employing interference cancellation. Especially in a non-ideal implementation, the ratio of interfering and primary signal should be constrained for successful interference cancellation.

Figure 6:
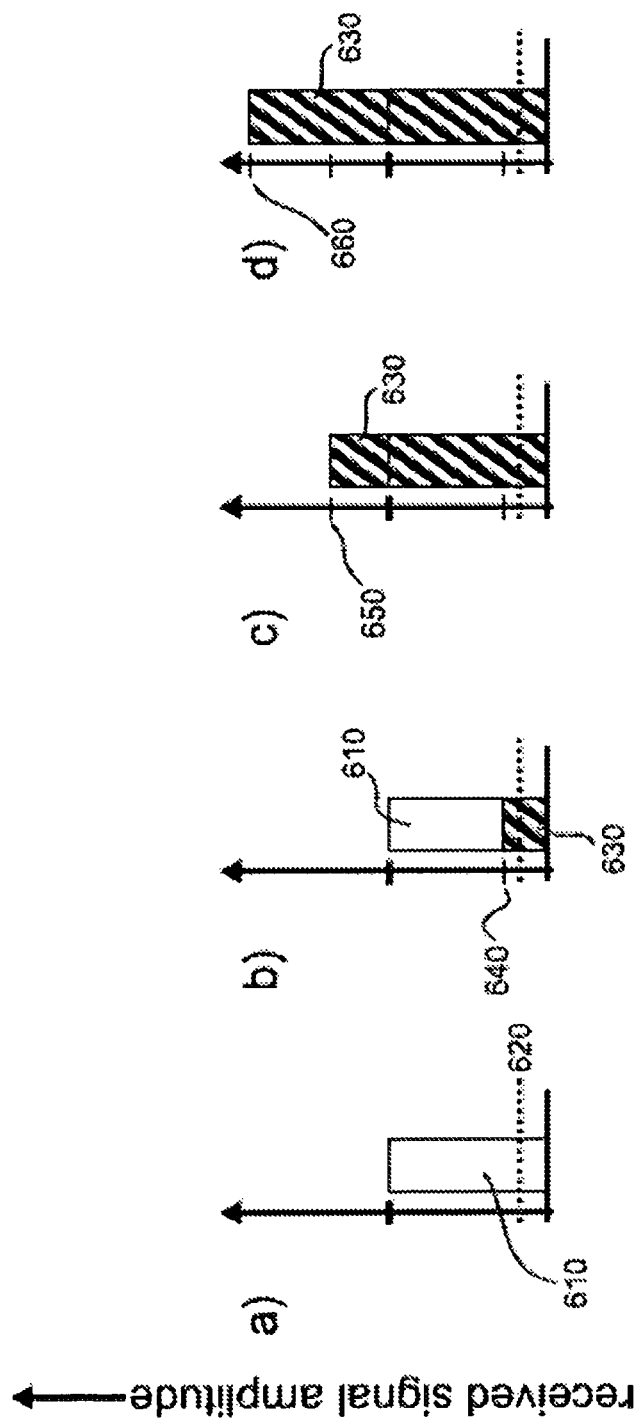
FIGS. 6(a)-6(d) illustrate graphical representations demonstrating an exemplary received primary signal and interfering signal strength at a receiver in a communication system in accordance with the principles of the present invention.

Turning now to FIGS. 6(a)-6(d), illustrated are graphical representations demonstrating an exemplary received primary signal and interfering signal strength at a receiver (e.g., the first receiver 520) in a communication system (e.g., the communication system of FIG. 5) in accordance with the principles of the present invention. FIG. 6(a) illustrates a received primary (wanted) signal 610 at the first receiver 520 relative to a noise floor 620 illustrated by the dashed line. A signal-to-noise ratio of the primary signal 610 is high and the decoding thereof is generally successful.

Regarding FIG. 6(b), an interfering signal 630 has been added. The level of the interfering signal 630 is chosen at a limit 640, where the interfering signal 630 starts to cause intolerable interference to the reception of the primary signal 610 at the first receiver 520. "Intolerable interference" may be defined, for example, by the need to preserve a remaining signal-to-noise and interference ratio ("SNIR") of at least 8 dB, which may depend on a modulation and coding scheme ("MCS"). An interfering signal below the limit 640 can be tolerated without the need for interference cancellation. An interfering signal 630 above the limit 640 will degrade or otherwise disrupt reception of the primary signal 610 at the first receiver 520 if interference cancellation is not employed.

A signal level 650 of the interfering signal 630 in FIG. 6(c) is now shown above a signal level 650 of the primary signal 610. While the primary signal 610 is initially obscured, it is possible to decode the interfering signal 630, reconstruct, and subtract the same with some level of accuracy from the primary signal 610. The signal level 650 of the interfering signal 630 in FIG. 6(c) is the smallest possible interfering signal level where decoding and subtraction of the interfering signal 630 succeeds in the presence of the primary signal 610.

Finally, in FIG. 6(d), a signal level 660 of the interfering signal 630 has been raised to a maximum level that can be handled with interference cancellation. Due to non-idealities such as channel frequency response, transmitter nonlinearity, frequency error, irregularities due to motion of the receiver, limited dynamic range at the receiver, etc., it is very difficult to perfectly cancel the interfering signal. For interfering signal levels higher than the signal level 660 shown in FIG. 6(d), intolerable interference results despite the use of interference cancellation.

Figure 7:
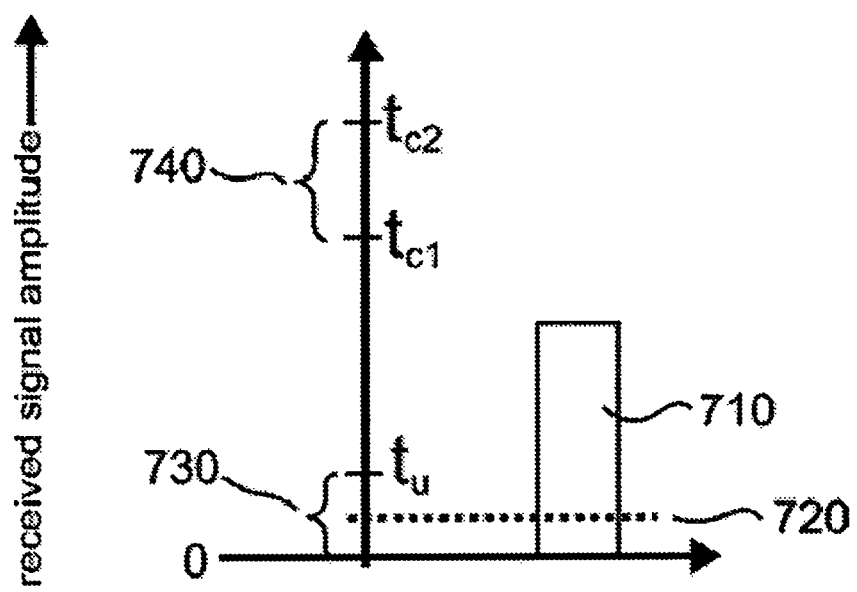
FIG. 7 illustrates a graphical representation demonstrating exemplary ranges of interfering signal strengths at a receiver wherein interference cancellation can be applied and thresholds that provide an opportunity for reuse of communication resources in accordance with the principles of the present invention.

Turning now to FIG. 7, illustrated is a graphical representation demonstrating exemplary ranges of interfering signal strengths at a receiver wherein interference cancellation can be applied and thresholds that provide an opportunity for reuse of communication resources in accordance with the principles of the present invention. FIG. 7 illustrates a received primary (wanted) signal 710 and a noise floor 720, for example, caused by noise processes in the receiver such as Johnson noise.

A threshold $t_u$ is the highest (e.g., maximum) level of an interfering (unwanted) signal that can be tolerated at a receiver without the need for interference cancellation to receive a primary (wanted) signal. The receiver predicts a primary signal strength $P_{primary}$. The receiver also predicts a modulation and coding scheme $MCS_{primary}$. Further, the receiver predicts a minimum signal-to-noise ratio $SNR_{primary}$ to decode a primary signal using the modulation and coding scheme $MCS_{primary}$, and a margin "m" (e.g., m=3 dB), which can be fixed or selected depending on the modulation and coding scheme $MCS_{primary}$. The receiver then determines the threshold (e.g., $t_u=P_{primary}-SNR_{primary}-m$ (in dB)). The predicting processes can be performed by taking a past value of the parameter or an average of the parameter's recent history.

A threshold $t_{c1}$ is the lowest (e.g., minimum) level of an interfering signal at a receiver wherein interference cancellation can be practically employed to prevent intolerable interference. In other words, at interfering signal levels below the threshold $t_{c1}$, interference cancellation is not able to decode the interfering signal. The receiver determines a reference signal-to-noise ratio "$SNR_{ref}$" that is required to successfully decode a signal encoded with a reference modulation and coding scheme. The reference modulation and coding scheme may be 1/5-coded quadrature phase-shift keyed ("QPSK") modulation and coding scheme and the reference signal-to-noise ratio $SNR_{ref}$ may be -2 dB. The receiver further determines a margin "a". The margin "a" may be a predetermined constant with a value of 3 dB. The receiver calculates threshold $t_{c1}$ ($t_{c1}i=P_{primary}+SNR_{ref}+a$ (in dB)). For example, the receiver may choose a=3 dB and calculate the threshold $t_{c1}=P_{primary}-2$ dB +3 dB=$P_{prmary}+1$ dB.

The threshold $t_{c2}$ is the highest (e.g., maximum) level of an interfering signal at a receiver where interference cancellation can prevent intolerable interference. In other words, at interfering signal levels above the threshold $t_{c2}$, interference cancellation is not effective because the interfering signal is too strong to enable the primary signal to be decoded. The receiver calculates a threshold parameter $t_{c2a}=P_{primary}-SNR_{primary}+b$ (in dB), where "b" is a predicted cancellation accuracy. Cancelling an interfering signal leaves a residual signal "b" dB below the original interfering signal level. The parameter "b" may be predetermined for instance at 30 dB. The parameter "b" may be adjusted depending on the propagation environment. If past history shows operation in a highly frequency selective environment (e.g., strong multipaths in the transmission channel and/or significant delay spread), a smaller value can be used for the parameter "b". If past history indicates mobility of the user equipment, a smaller value will generally be used for the parameter "b". The parameter "b" may be adjusted based on an estimated level of residual interference strength after interference cancellation. A threshold parameter $t_{c2b}$ is then calculated as the maximum power that the receiver front end can handle, which is generally limited by distortion in a low-noise amplifier or mixer. The threshold parameter $t_{c2b}$ may also be limited by clipping in an analog-to-digital converter. Then the threshold $t_{c2}$ is calculated as $t_{c2}=\min(t_{c2a}, t_{c2b})$.

Thus, an interval (window) 730 represents a range of received signal amplitudes in which interference cancellation is not necessary because the amplitude of the received primary signal is sufficiently greater than the amplitude of the interfering signal. In linear power units (e.g., watts), the interval 730 may extend from zero (W) to $t_u$ (W). When converted to a logarithmic measure of power (e.g.m represented in units of dB), the interval 730 may extend from minus infinity (dB) to $t_u$ (dB). An interval (window) 740 represents a range of received signal amplitudes in which interference cancellation may be employed to advantage to reliably decode the primary signal 710. The interval 740 may extend between thresholds $t_{c1}$ to $t_{c2}$. As will become more apparent, successful decoding at the receiver depends on the modulation and coding scheme of the interfering signal.

Figure 8:
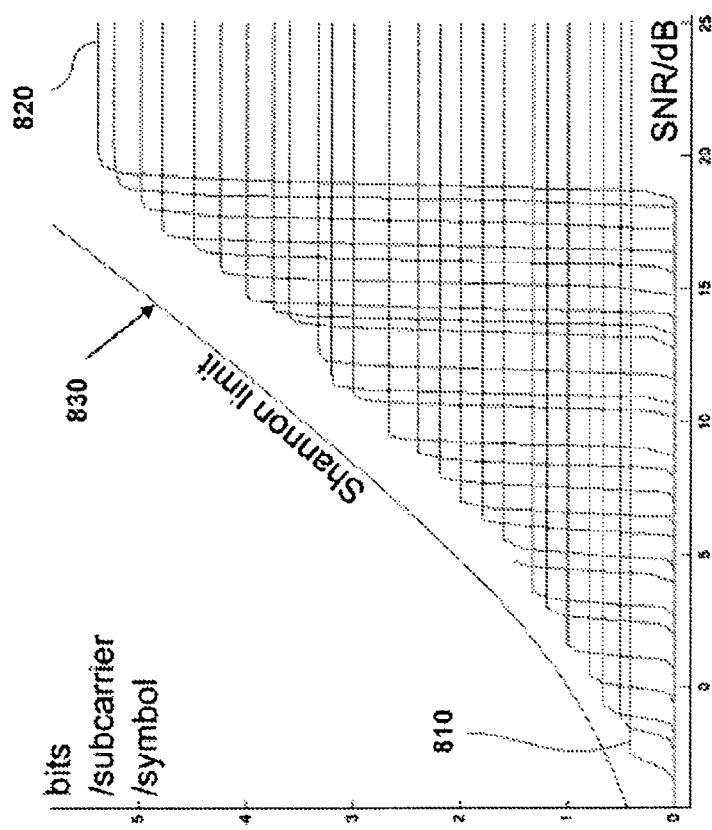
FIG. 8 illustrates a graphical representation of exemplary throughput versus signal-to-noise ratio of different modulation and coding schemes in a downlink of a communication system in accordance with the principles of the present invention.

Turning now to FIG. 8, illustrated is a graphical representation of exemplary throughput versus signal-to-noise ratio of different modulation and coding schemes in a downlink of a communication system (e.g., a downlink in an LTE-based communication system) in accordance with the principles of the present invention. A curve 810 corresponds to a 1/5-coded quadrature phase-shift keyed ("QPSK") modulation and coding scheme (an example for a robust modulation and coding scheme that achieves a low data rate (bits/subcarrier/symbol), but works reliably at low signal-to-noise ratios. A curve 820 is a 9/10 coded 64 quadrature amplitude modulated ("QAM") modulation and coding scheme, which is an example for a less robust modulation and coding scheme that achieves a high data rate at high signal-to-noise ratios. Reliable decoding is achieved once a curve reaches a plateau. A curve 830 represents the Shannon channel capacity limit. The most robust modulation and coding scheme such as 1/5-coded QPSK modulation and coding scheme may be selected as the reference modulation and coding scheme. In other words, threshold $t_{c1}$ may indicate the lowest received signal strength of an interfering signal using the reference modulation and coding scheme that can be processed using interference cancellation.

For each modulation and coding scheme $MCS_{interferer}$, one may define an offset $\Delta A(MCS_{interferer})$ for the increase in required SNR to decode the modulation and coding scheme relative to the reference modulation and coding scheme. For example, FIG. 8 shows that the curve 820 requires approximately 22 dB more SNR than curve 810 to reach a plateau. Thus, $\Delta$(1/5-coded QPSK modulation and coding scheme)=0 dB and $\Delta$(9/10 64 QAM modulation and coding scheme)=22 dB. In the illustrated embodiment, the modulation and coding schemes are staged approximately in 0.9 dB steps.

Referring again to FIG. 5, the second transmitter (an interfering transmitter) 530 may use a less robust modulation and coding scheme (e.g., one employing a larger number of bits per symbol per subcarrier, such as shown by curve 820 in FIG. 8) to achieve higher throughput in the transmission to the second receiver 540. Accordingly, at the first receiver 520, the minimum signal level required for which interference cancellation is possible (threshold $t_{c1}$) increases by $\Delta(MCS_{interferer})$. The upper threshold $t_{c2}$ for cancellation remains largely unaffected by the choice of the modulation and coding scheme for the interfering signal, effectively resulting in a range (i.e., "interval or window," $[t_{c1}+\Delta(MCS_{interferer}) \ldots t_{c2}]$) for the received signal strength of an interfering signal using the modulation and coding scheme $MCS_{interferer}$ that can be handled using interference cancellation. The relationship between the thresholds or parameters $t_u$, $t_{c1}$, $t_{c2}$, $MCS_{interferer}$, $P_{primary}$ and $MCS_{primary}$ may depend on the type of interference cancellation that is implemented at the receiver. For example, successive interference cancellation ("SIC") may decode the interfering signal first, then subtract the same and subsequently decode the primary signal. Other types of interference cancellation such as parallel interference cancellation ("PIC") or joint decoding may process interferer and primary signal simultaneously. The receiver may calculate the thresholds $t_u$, $t_{c1}$, and $t_{c2}$ in a manner that is appropriate for the implemented interference cancellation scheme. The receiver may process a primary signal that allows parallel decoding, such as obtained by superposition coding. The receiver may determine multiple intervals of received signal strength that enable the use of interference cancellation using known interference cancellation techniques available at a receiver.

As illustrated in FIG. 7 with the related discussion herein, interference cancellation creates opportunities for reusing a communication resource (e.g., a channel, time slot, sub-band or a combination thereof) between a receiver and a transmitter. Compared to an exclusive assignment of one communication resource to one communication path or link, sharing of a communication resource using interference cancellation improves overall performance, since more resources are available to each communication link. Interference cancellation creates opportunities to share a communications resource between communication links. A process to detect and exploit such an opportunity is introduced herein.

Figure 9:
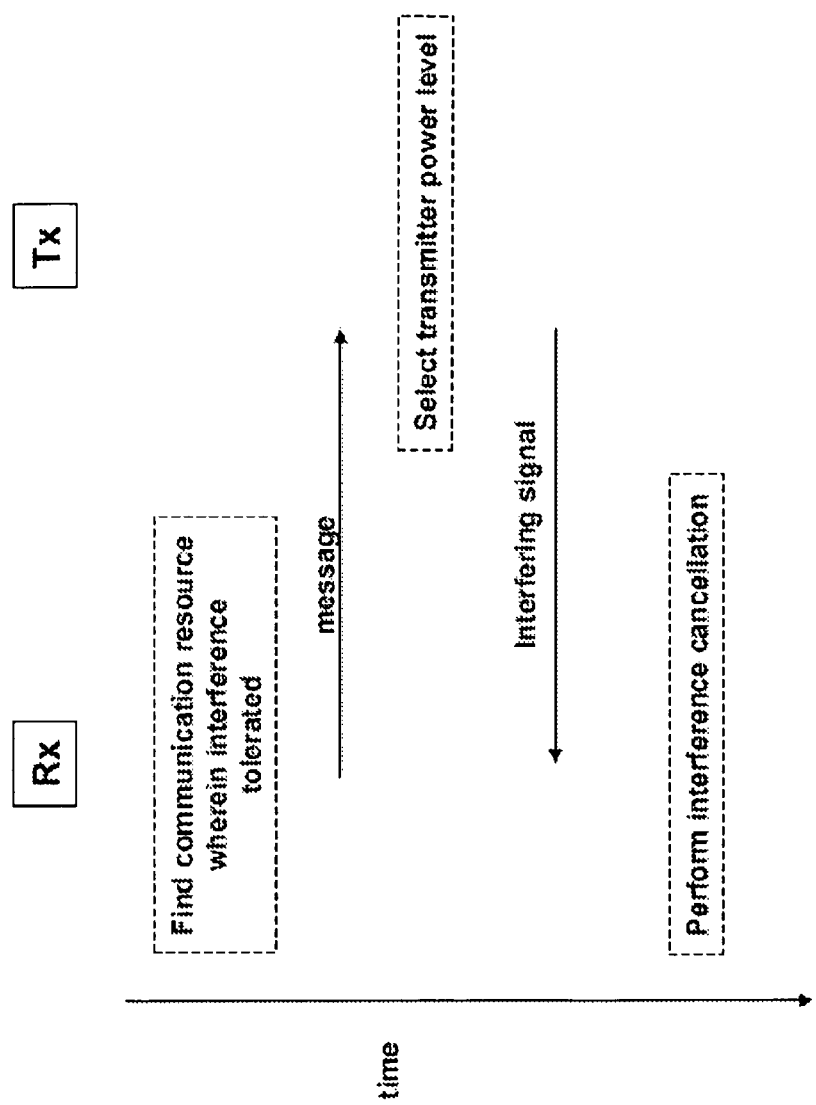
FIG. 9 illustrates a diagram demonstrating an exemplary interference cancellation process in accordance with the principles of the present invention.

Turning now to FIG. 9, illustrated is a diagram demonstrating an exemplary interference cancellation process in accordance with the principles of the present invention. A receiver (designated "Rx") identifies a communication resource where interference can be tolerated. The receiver determines a maximum level of an interfering signal that causes no intolerable degradation to the reception of a primary signal without the use of interference cancellation. The receiver also determines minimum and maximum levels of a received interfering signal using a reference modulation-and-coding scheme that enable the use of interference cancellation for the reception of a primary signal. The receiver transmits a message (e.g., a broadcast message) with this information to transmitters in a surrounding area. The receiver thus indicates the interval (window) where an operational range of receiver interference cancellation can be performed. The nominal signal strength of the message may be predetermined (i.e., it may be constant and known). The nominal signal strength of the message is preferably encoded into the message.

A transmitter (designated "Tx") receives the message from the receiver, estimates the path loss of a signal transmitted by the transmitter to the receiver, and refers corresponding received signal levels at the receiver to transmit power levels at the transmitter. The transmitter accordingly selects a transmitter power level, which it uses to transmit signals on the communication resource that appear to the receiver as interfering signals. The receiver employs interference cancellation to subtract the interfering signal transmitted by transmitter from a received primary (wanted) signal.

Figure 10:
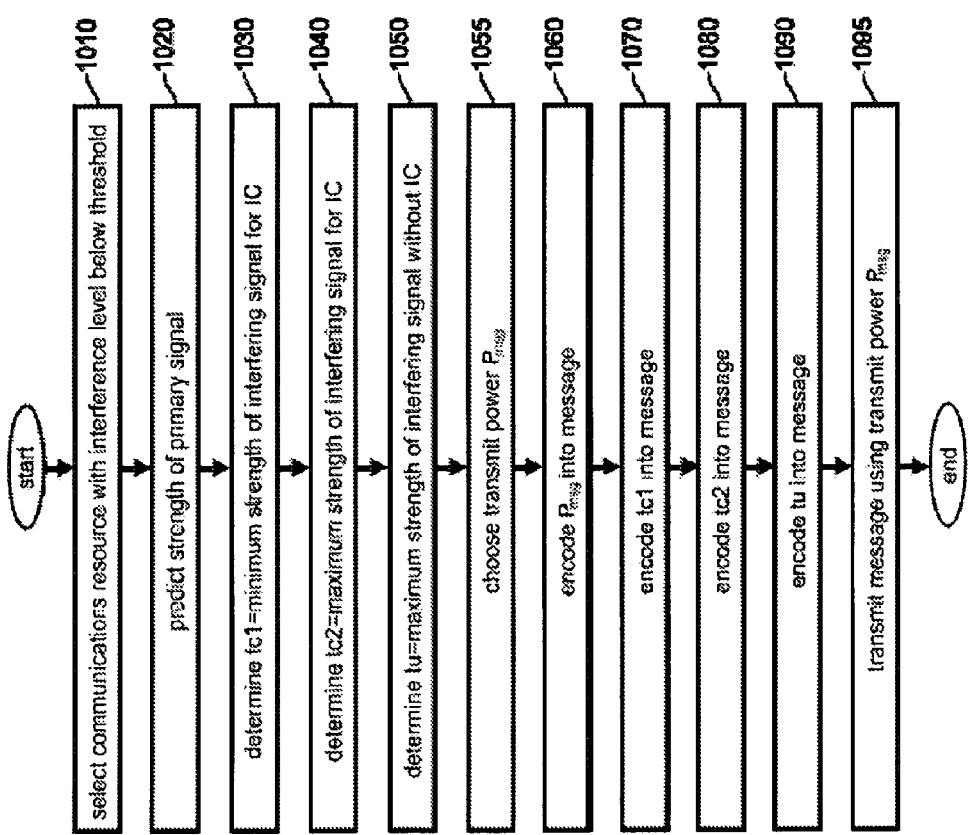
FIGS. 10 and 11 illustrate flowcharts of embodiments of interference cancellation processes in accordance with the principles of the present invention.

Turning now to FIG. 10, illustrated is a flowchart of an embodiment of an interference cancellation process in accordance with the principles of the present invention. The interference cancellation ("IC") process may be performed in accordance with a receiver of a communication system such as the first receiver 520 illustrated and described with respect to FIG. 5. A receiver determines a level at which the receiver can tolerate more interference on a communication (e.g., radio) resource. The receiver determines appropriate interference levels and signals the interference levels in a message in the communication system.

In a first step 1010, the receiver selects a communication resource with no strong interferers (or interfering signals). In particular, only communication resources are selected where no interference cancellation is currently in use. The communication resource is selected based on a measure of signal quality on the communication resource. In a step 1020, the receiver predicts/estimates the future strength of a primary (wanted) signal. The prediction may include estimating the strength of a primary signal and using the estimate as the prediction. The prediction may be based on a target range of a power control loop. The receiver is able to maintain the target strength by issuing power control requests to the transmitter of the primary signal over a transmission path therebetween.

In a step 1030, a threshold $t_{c1}$ is determined that represents the lowest (e.g., minimum) level of an interfering (unwanted) signal at the receiver wherein interference cancellation can be practically employed to prevent intolerable interference based on the predicted signal strength of the primary signal. This step may use a reference modulation and coding scheme for the interfering signal. For example, interference cancellation at 1/5-coded QPSK modulation and coding scheme (a reference modulation and coding scheme) requires a SNIR of −2 dB. Leaving a 3 dB margin, the receiver determines that the threshold $t_{c1}$ as 1 dB, relative to the predicted signal strength of the primary signal. Further, the receiver may decide that primary signal quality is below a target setting (e.g., due to the presence of other, low-level interferers) and as a result increase the threshold $t_{c1}$ by, for instance, 3 dB.

In a step 1040, a threshold $t_{c2}$ is determined that represents the highest (e.g., maximum) level of an interfering signal at a receiver where interference cancellation can prevent intolerable interference based on the predicted signal strength of the primary signal. Thus, based on the predicted signal strength of the primary signal and a known performance limit of the interference cancellation receiver, the receiver determines the maximum allowable strength of the interfering signal. For example, the threshold $t_{c2}$ may be 25 dB relative to the predicted signal strength of the primary signal, resulting from a limited dynamic range of a radio front end.

In a step 1050, based on the predicted signal strength of the primary signal, the receiver determines a threshold $t_u$ representing the highest (e.g., maximum) level of an interfering signal that can be tolerated at a receiver without the need for interference cancellation to receive the primary signal. The threshold $t_u$ may be reduced if the predicted SNIR of the primary signal is below a predetermined threshold. For example, the receiver may choose the threshold $t_u$ as 3 dB below a predicted noise floor.

In a step 1055, the receiver chooses a transmit power $P_{msg}$ for a message (e.g., a broadcast message) to be transmitted to transmitters in a surrounding area. The transmit power $P_{msg}$ may be a predetermined constant. In a step 1060, the receiver encodes the transmit power $P_{msg}$ into the message. Encoding may be done implicitly, for example, by using a predetermined transmit power level for a given type of message. In steps 1070, 1080 and 1090, the receiver encodes the thresholds $t_{c1}$, $t_{c2}$, $t_u$, respectively, into the message. In a step 1095, the receiver transmits the message using the chosen transmit power $P_{msg}$. The transmission may be of broadcast or beacon type. The message may thus be addressed to one transmitter, to a subset of transmitters, or to all of the transmitters within a reasonable distance from the receiver.

Figure 11:
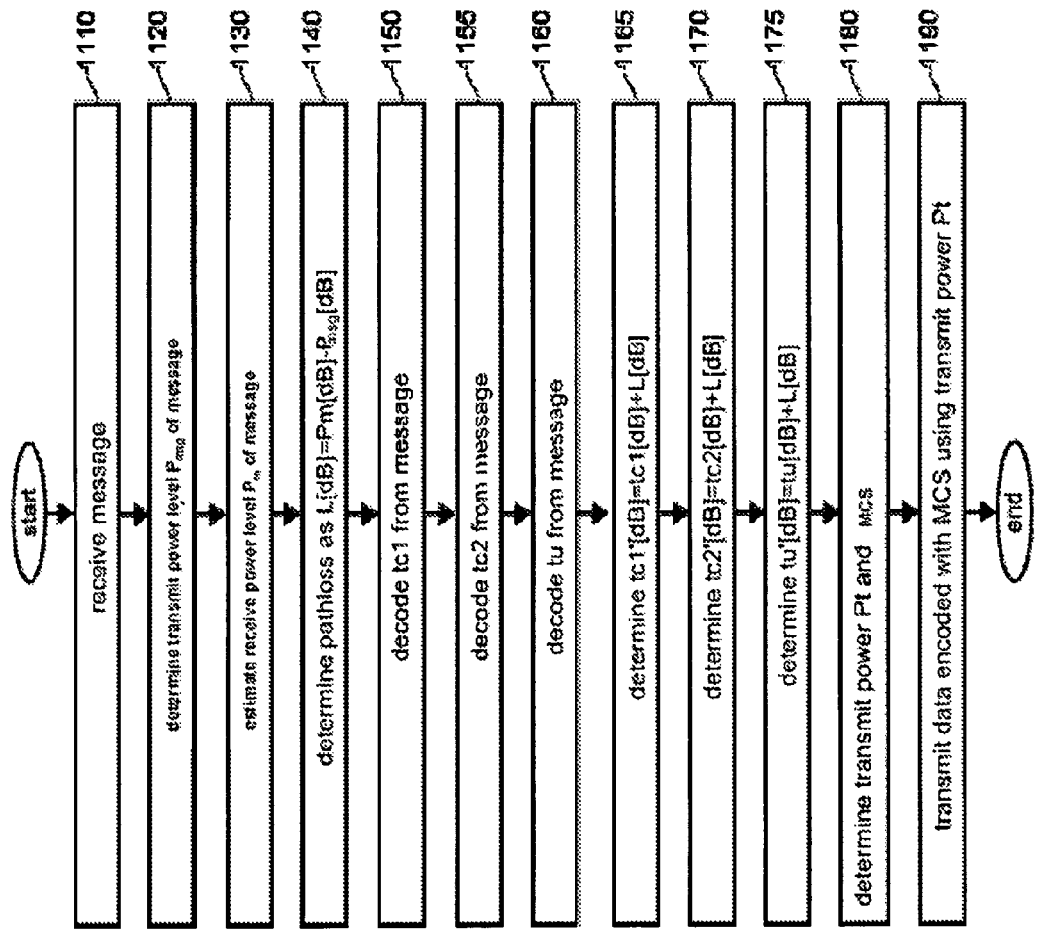

Turning now to FIG. 11, illustrated is a flowchart of an embodiment of an interference cancellation process in accordance with the principles of the present invention. The interference cancellation ("IC") process may be performed in accordance with a transmitter of a communication system such as the second transmitter 530 illustrated and described with respect to FIG. 5. In a step 1110, a message is received from a receiver such as the first receiver 520 illustrated and described with respect to FIG. 5. In a step 1120, a transmit power level $P_{msg}$ of the message is determined. The transmit power level $P_{msg}$ may be obtained from an encoded field in the message, or as a predetermined transmit power for a given type of message. In a step 1130, the received signal strength or power level $P_m$ of the message is estimated. In a step 1140, the path loss ($L = P_{msg} - P_m$ (in dB)) of the message transmission is determined. Assuming reciprocity and time invariance of the communication channel, the path loss L may also predict the attenuation of a transmission by the transmitter that appears at the receiver as an interfering signal.

In a step 1150, a threshold $t_{c1}$ is decoded/retrieved from the message. The threshold $t_{c1}$ represents the lowest (e.g., minimum) level of an interfering (unwanted) signal at the receiver wherein interference cancellation can be practically employed to prevent intolerable interference. In a step 1155, a threshold $t_{c2}$ is decoded/retrieved from the message. The threshold $t_{c2}$ represents the highest level (e.g., maximum) of an interfering signal at the receiver where interference cancellation can prevent intolerable interference. In a step 1160, a threshold $t_u$ is decoded/retrieved from the message. The threshold $t_u$ represents the highest (e.g., maximum) level of an interfering signal that can be tolerated at the receiver without the need for interference cancellation to receive a primary (wanted) signal.

In steps 1165, 1170, 1175, the thresholds $t_{c1}$, $t_{c2}$, $t_u$ are referred to power levels at the transmitter $t_{c1}'$, $t_{c2}'$, $t_u'$ using the path loss estimate L, according to the equations $t_{c1}' = t_{c1} + L$ (in dB), $t_{c2}' = t_{c2} + L$ (in dB) and $t_u' = t_u + L$ (in dB). In a step 1180, the transmitter selects a modulation and coding scheme $MCS_t$ and a transmit power level $P_t$ in view of the thresholds $t_{c1}'$, $t_{c2}'$, $t_u'$. The transmit power level $P_t$ may be constrained by the following.

$$P_t >= t_{c1}' + \Delta(MCS_t) \text{ and } P_t <= t_{c2}' \text{ (in dB); or} \qquad \text{constr\_1:}$$

$$P_t <= t_u' \text{ (in dB)} \qquad \text{constr\_2.}$$

Methods to choose a combination of modulation and coding scheme and transmit power on a plurality of communication resources in general are known as link adaptation. For example, link adaptation may assign transmit power levels to communication resources using the "waterfilling" algorithm, estimate a signal-to-noise ratio on each resource, and choose the most suitable modulation and coding scheme. Given additional constraints, such as (constr\_1, constr\_2), link adaptation may use various optimization techniques to choose modulation and coding scheme and transmit power. A transmit power level $P_t$ and modulation and coding scheme MCS in agreement with constr\_1 results in an interfering signal at the receiver that can be handled using interference cancellation, preventing intolerable interference to the receiver's primary signal. Alternatively, choosing the transmit power level $P_t$ according to constr\_2 prevents intolerable interference to the receiver by limiting the level of the interfering signal. In a step 1190, the transmitter transmits data using the transmit power level $P_t$ and the modulation and coding scheme.

In a flexible spectrum use scheme, the use of interference cancellation frees communication resources to improve a level-of-service for a wireless communication device at, for instance, the edge of a cell where reception is generally difficult, but nonetheless presents challenges for allocation of scarce communication resources in a communication system. Therefore, a key purpose of flexible spectrum use is to limit the number of communication resources that may be occupied by a particular wireless communication device, and thereby improve "fairness" for the wireless communication device in a difficult reception environment, such as at the edges of a cell.

The number of communication resources simultaneously used by a particular wireless communication device can be restrained by a so-called "reservation limit" that results from flexible spectrum use negotiations. For example, at a given time, the reservation limit for a wireless communication device may be limited to 20 out of 100 communication resources. Here, a "reservation" can mean transmitting on the communication resource or reserving the same for reception, effectively preventing nearby wireless communication devices from transmitting on the same communication resource.

As described herein, a receiving wireless communication device can advertise an opportunity to reuse a communication resource by transmitting a message, for example using a beacon or broadcast-type transmission. Another receiving wireless communication device can then, based on the received information, transmit on the communication resource at a controlled power level, allowing the use of interference cancellation at the receiving wireless communication device. While the approach is clearly beneficial for overall performance, it puts the receiving wireless communication device that has volunteered to employ interference cancellation at a disadvantage. While previously undisturbed reception on a communication resource was possible, it is now necessary to use interference cancellation, which bears an operational cost due to the extra signal processing required to perform interference cancellation.

Generally, interference cancellation is not perfect because the resulting SNR is worse than that achievable in the absence of the interfering signal. The interference cancellation process may add latency, and a received primary (wanted) signal is accordingly delayed by the time it takes to decode and subtract the interfering signal. The interference cancellation process consumes power at the receiver (e.g., wireless communication device), shortening the battery life thereof. Thus, what is needed is an "incentive" for a receiver to advertise an opportunity for reuse, and thereby volunteer to accept the burden resulting from performing interference cancellation.

In an improved system to employ flexible spectrum use as introduced herein, a receiver determines a reservation limit of communication resources in a negotiation process. The receiver detects an interfering signal on a communication resource and then signals an opportunity for joint use of the communication resource. The receiver uses interference cancellation on the communication resource, and upon successful execution of interference cancellation, requests an increase of the reservation limit of communication resources in view of the ability of two receivers to communicate on the same communication resource. In accordance therewith, the receiver may request an increase in the communication resource reservation limit when a signal power level of a signal (e.g., an interfering signal) from another transmitter (e.g., another wireless communication device or base station) exceeds a predetermined threshold.

For example, the receiver may ordinarily be limited to 20 out of 100 communication resources for reception. The receiver determines a range of interference levels that can be tolerated by employing interference cancellation. The receiver broadcasts the power level range, creating an opportunity to reuse the communication resources. A transmitter (e.g., another wireless communication device or base station) receives the message, and selects a transmit power level and modulation and coding scheme that enables interference cancellation at the receiver. The transmitter then begins to transmit, and the receiver detects the interfering signal and starts to use interference cancellation. Upon successful use of interference cancellation, the receiver requests an increase of its reservation limit from 20 to 21. The receiver thus attempts to negotiate via, for instance, flexible spectrum use messaging additional communication resources above its previous reservation limit.

In one mode of operation, a receiver selects a communication resource used by a suitable, dominant interferer, and then reserves the same for reception to keep secondary interferers out. The interfering transmitter would not notice the reservation request. The interfering transmitter has already established a valid reservation and is not obliged to continue to scan for conflicts because it has already established unencumbered access to the communication resource. Thus, using system, processes and methods introduced herein, a communication system can advantageously recognize and exploit situations where reuse of communication resources can be employed using interference cancellation. The use of interference cancellation improves the overall performance of the communication system.

Figure 12A:
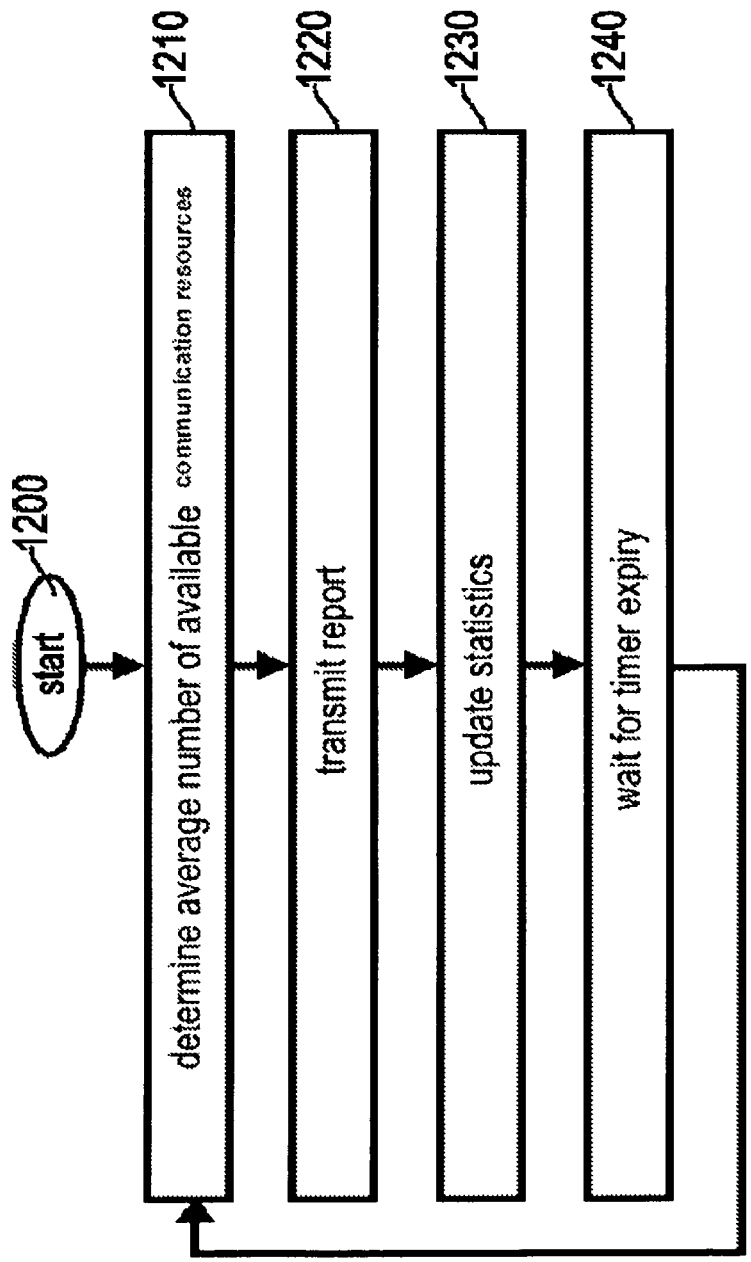
FIGS. 12A and 12B illustrate flow diagrams of embodiments of methods of determining a communication resource reservation limit in accordance with the principles of the present invention.
Figure 12B:
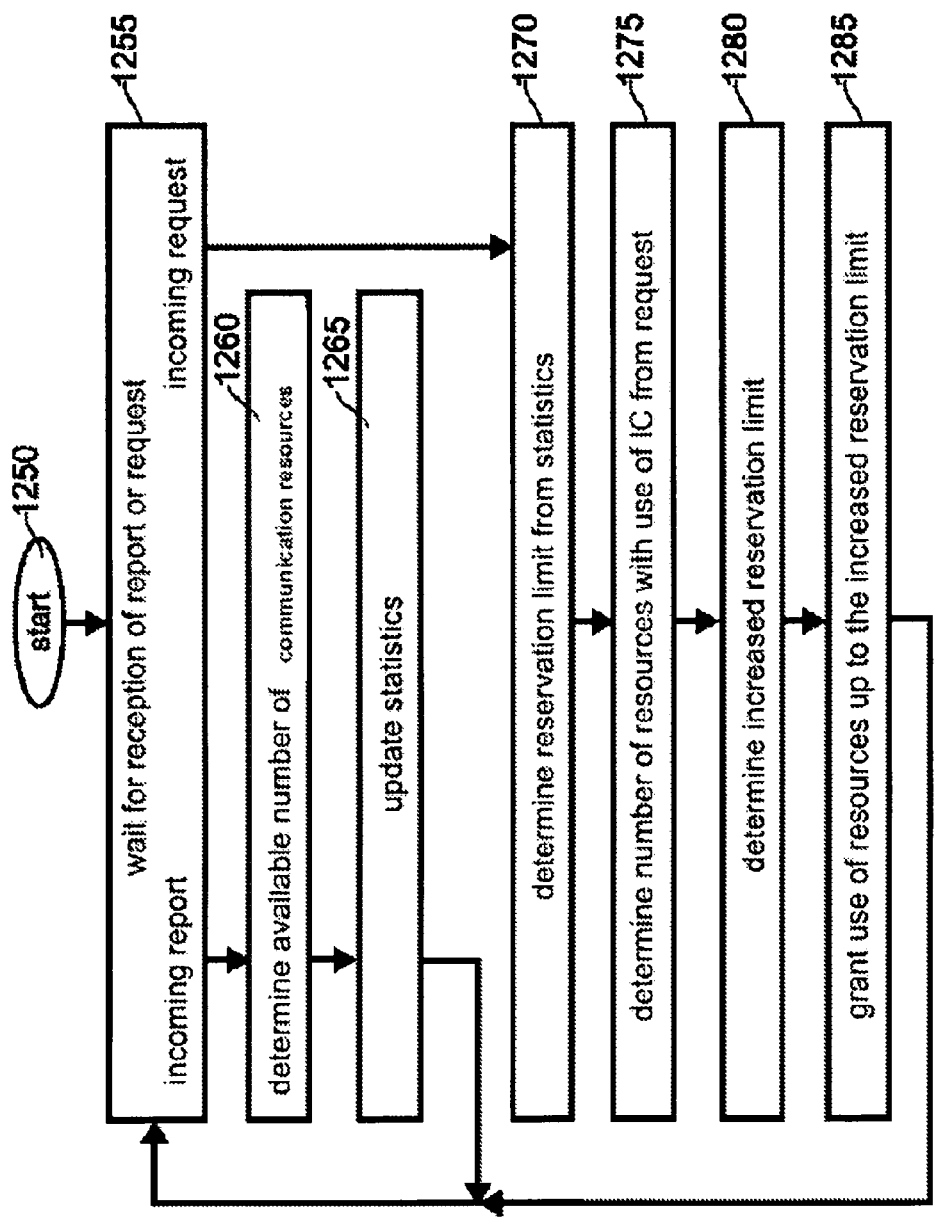

Turning now to FIGS. 12A and 12B, illustrated are flow diagrams of embodiments of methods of determining a communication resource reservation limit in accordance with the principles of the present invention. In general, the method includes determining/providing a communication resource reservation limit, receiving/granting/denying the request for an increase of the communication resource reservation limit and performing "negotiations" between a communication device and nearby communication devices. The method may be performed by a processor (e.g., a module such as a flexible spectrum use module thereof) in accordance with memory in a communication device such as a base station or wireless communication device such as a user equipment. The module may serve one or a plurality of communication devices in a communication system. Additionally, the module may be embodied in an access point that serves user equipment connected thereto or a module in a mobile management entity/system architecture evolution gateway (e.g., MME/SAE GW designated 430 in FIG. 4) that serves base stations and the corresponding user equipment.

In particular and in accordance with an exemplary embodiment illustrated in FIG. 12A; the method is executed in accordance with a module and begins at a start step 1200. In a step 1210, the module determines an average number of available communication resources of served communication devices. A communication resource is available, if the communication device can reserve the same or the communication resource is already reserved by the communication device. In a step 1220, a report message is transmitted to nearby other flexible spectrum use modules, encoding the determined average number of available communication resources. In a step 1230, the module updates its own statistics based on the determined average number of available communication resources and treats its own report message no different from the report messages received from other modules. In a step 1240, the module waits for the expiration of a timer (e.g., 500 milliseconds ("ms") and, upon expiration of the timer, the method returns to step 1210.

Turning now to FIG. 12B, a method operable in parallel with the aforementioned method is executed in accordance with the module and begins at a start step 1250. In a step 1255, execution of the method is suspended until either a report message or a request message is received. In a step 1260, a report message has been received from another flexible spectrum use module in the form of a radio message through a communication system infrastructure such as X2/S1 interfaces illustrated in FIGS. 3 and 4. In accordance therewith, the module determines the available number of communication resources from the report message. In a step 1265, the module updates its own statistics based on the determined average number of available communication resources. The statistics may include a global average number of available communication resources and a minimum number of available communication resources. The method thereafter returns to step 1255.

In a step 1270, the module has received a request for increasing a communication resource reservation limit from a communication device and determines a communication resource reservation limit. The module may determine the communication resource reservation limit as the global average number of available communication resources. In a step 1275, the module determines the number of communication resources, where interference cancellation is used by the requesting communication device. In a step 1280, the module determines an increased communication resource reservation limit. The module may determine the increased communication resource reservation limit by adding the above number of communication resources where interference cancellation is used to the communication resource reservation limit. In a step 1285, the module grants an increase of the communication resource reservation limit up to the determined increased communication resource reservation limit. The grant of the communication resources may be shared between a plurality of communication devices with the opportunity for the communication devices to perform interference cancellation on an interfering signal. The method thereafter returns to step 1255.

Thus, a communication device such as a wireless communication device (a receiver) can determine a reservation limit of communication resources in the negotiation process. The wireless communication device can also detect an interfering signal on a communication resource and signal an opportunity for joint use of the communication resource. The wireless communication device can use interference cancellation on the communication resource, and upon successful execution of interference cancellation, request an increase of the reservation limit of communication resources in view of the ability of two receivers (e.g., the wireless communication device and a neighboring wireless communication device) to communicate on the same communication resource.

Figure 13:
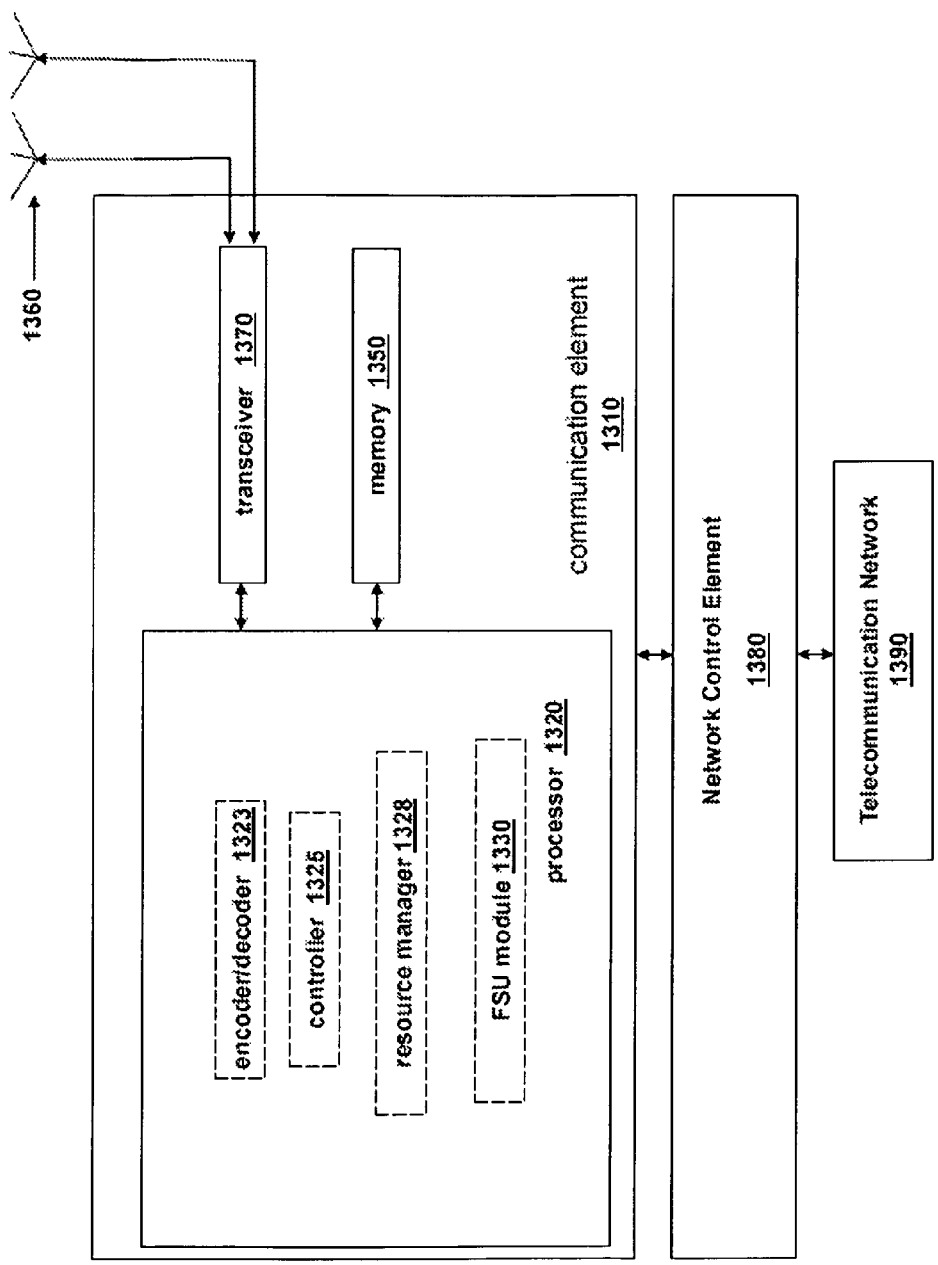
FIG. 13 illustrates a block diagram of an embodiment of a communication element of a communication system constructed in accordance with the principles of the present invention.

Turning now to FIG. 13, illustrated is a block diagram of an embodiment of a communication element 1310 of a communication system constructed in accordance with the principles of the present invention. The communication system may include, for example, a cellular network. The communication element or device 1310 may represent, without limitation, a base station and a wireless communication device (e.g., a subscriber station, a terminal, a mobile station, a user equipment), or the like. The communication element 1310 includes, at least, a processor 1320 and memory 1350 that stores programs and data of a temporary or more permanent nature. The communication element 1310 may also include a radio frequency transceiver 1370 coupled to the processor 1320 and a plurality of antennas (one of which is designated 1360). The communication element 1310 may provide point-to-point and/or point-to-multipoint communication services.

The communication element 1310, such as a base station in a cellular network, may be coupled to a communication network element, such as a network control element 1380 coupled to a public switched telecommunication network 1390 ("PSTN"). The network control element 1380 may, in turn, be formed with a processor, memory, and other electronic elements (not shown). The network control element 1380 generally provides access to a telecommunication network such as a PSTN 1390. Access may be provided using fiber optic, coaxial, twisted pair, microwave communication, or similar link coupled to an appropriate link-terminating element. A communication element 1310 formed as a wireless communication device is generally a self-contained communication device.

The processor 1320 in the communication element 1310, which may be implemented with one or a plurality of processing devices, performs functions associated with its operation including, without limitation, encoding and decoding (encoder/decoder 1323) of individual bits forming a communication message, formatting of information, and overall control (controller 1325) of the communication element 1310, including processes related to management of communication resources represented by resource manager 1328. Exemplary functions related to management of communication resources include, without limitation, hardware installation, traffic management, performance data analysis, tracking of end users and equipment, configuration management, end user administration, management of wireless communication devices, management of tariffs, subscriptions and security, and billing, accumulation and management of characteristics of a local area network, management of communication resources, and the like. The execution of all or portions of particular functions or processes related to management of communication resources may be performed in equipment separate from and/or coupled to the communication element 1310, with the results of such functions or processes communicated for execution to the communication element 1310. The processor 1320 of the communication element 1310 may be of any type suitable to the local application environment, and may include one or more of general-purpose computers, special-purpose computers, microprocessors, digital signal processors ("DSPs"), field-programmable gate arrays (FPGAS), application-specific integrated circuits (ASICS), and processors based on a multi-core processor architecture, as non-limiting examples.

The transceiver 1370 of the communication element 1310 modulates information onto a carrier waveform for transmission by the communication element 1310 via the antenna 1360 to another communication element. The transceiver 1370 demodulates information received via the antenna 1360 for further processing by other communication elements. The transceiver 1370 is capable of supporting duplex operation for the communication element 1310.

The memory 1350 of the communication element 1310, as introduced above, may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. The programs stored in the memory 1350 may include program instructions or computer program code that, when executed by an associated processor, enable the communication element 1310 to perform tasks as described herein. Of course, the memory 1350 may form a data buffer for data transmitted to and from the communication element 1310. Exemplary embodiments of the system, subsystems, and modules as described herein may be implemented, at least in part, by computer software executable by processors of, for instance, the user equipment and the base station, or by hardware, or by combinations thereof. As will become more apparent, systems, subsystems and modules may be embodied in the communication element 1310 as illustrated and described herein.

When the communication element 1310 serves as a receiver (e.g., a user equipment) in a communication system, the memory 1350 and computer program code are configured, with the processor 1320, to cause a communication element 1310 to identify an interval of received signal power levels for interference cancellation of an interfering (unwanted) signal to a primary (wanted) signal, and generate a message (e.g., a broadcast message) that provides the interval of received signal power levels for the interference cancellation of the interfering signal to the primary signal for transmission to a base station. In accordance therewith, the memory 1350 and computer program code are configured, with the processor 1320, to cause a communication element 1310 to identify a communication resource employed by another communication element transmitting a signal with a received signal power level within the interval, and request an assignment of the communication resource to the communication element 1310. The memory 1350 and computer program code are also configured, with the processor 1320, to determine a communication resource reservation limit for the communication element 1310 and request an increase in the communication resource reservation limit. The memory 1350 and computer program code are also configured, with the processor 1320, to identify the interval as a function of a modulation and coding scheme in accordance with the primary signal. The memory 1350 and computer program code are also configured, with the processor 1320, to cause the communication element 1310 to perform interference cancellation of the interfering signal when the received signal power level is within the interval. Due to the interference cancellation, the interfering signal and the primary signal may be transmitted on a same communication resource.

Further when the communication element 1310 serves as a receiver in a communication system, the memory 1350 and computer program code are configured, with the processor 1320 (e.g., in accordance with a flexible spectrum use ("FSU") module 1330 thereof), to cause a communication element 1310 to determine a communication resource reservation limit therefore, and request (e.g., embodied in a message) an increase in the communication resource reservation limit. In accordance therewith, the memory 1350 and computer program code are configured, with the processor 1320, to cause the communication element 1310 to request the increase in the communication resource reservation limit when the communication element 1310 is adapted to perform interference cancellation of an interfering signal to a primary signal. The memory 1350 and computer program code are also configured, with the processor 1320, to cause the communication element 1310 to identify a communication resource employed by another communication element transmitting a signal with a received signal power level within an interval of received signal power levels for interference cancellation of an interfering signal to a primary signal to the communication element 1310, request the increase in the communication resource reservation limit in accordance therewith, and request an assignment of the communication resource to the communication element 1310. The memory 1350 and computer program code are also configured, with the processor 1320, to cause the communication element 1310 to identify an interval of received signal power levels for interference cancellation of an interfering signal to a primary signal, and generate a message that provides the interval of received signal power levels for the interference cancellation of the interfering signal to the primary signal. The memory 1350 and computer program code are also configured, with the processor 1320, to cause the communication element 1310 to request the increase in the communication resource reservation limit when the communication element 1310 detects that another communication element transmits a signal in a same communication resource as a primary signal for the communication element 1310. The memory 1350 and computer program code are also configured, with the processor 1320, to cause the communication element 1310 to request the increase in the communication resource reservation limit when a received signal power level of a signal transmitted by another communication element exceeds a predetermined threshold. The memory 1350 and computer program code are also configured, with the processor 1320, to cause the communication element 1310 to perform interference cancellation by decoding the interfering signal and employing a decoded interfering signal to improve a reception quality of the primary signal.

When the communication element 1310 serves as a transmitter (e.g., a base station) in a communication system, the memory 1350 and computer program code are configured, with the processor 1320, to cause a communication element 1310 to receive a message (e.g., a broadcast message) that provides an interval of received signal power levels for interference cancellation of an interfering signal to a primary signal at a receiver (e.g., a user equipment), and select a transmit signal power level for the interfering signal to fall within the interval of the received signal power levels at the receiver. In accordance therewith, the memory 1350 and computer program code are configured, with the processor 1320, to cause the communication element 1310 to receive a message from a plurality of receivers that provides an interval of received signal power levels for interference cancellation of an interfering signal to a primary signal at each of the plurality of receivers, and select a transmit signal power level for the interfering signal to fall within the interval of the received signal power levels at each of the plurality of receivers. The memory 1350 and computer program code are also configured, with the processor 1320, to cause the communication element 1310 to provide a communication resource reservation limit and increase the communication resource reservation limit in response to the message that provides the interval of received signal power levels. The interval may be a function of a modulation and coding scheme in accordance with the interfering signal. The interfering signal and the primary signal may be transmitted on a same communication resource (e.g., including a frequency and time-slot communication resource).

Further when the communication element 1310 serves as a transmitter in a communication system, the memory 1350 and computer program code are configured, with the processor 1320 (e.g., in accordance with a flexible spectrum use ("FSU") module 1330 thereof), to cause a communication element 1310 to determine a communication resource reservation limit for a receiver, and increase the communication resource reservation limit in response to a request (e.g., embodied in a message) from the receiver. In accordance therewith, the memory 1350 and computer program code are configured, with the processor 1320, to cause the communication element 1310 to increase the communication resource reservation limit in response to a message (e.g., a broadcast message) providing an interval of received signal power levels for interference cancellation of an interfering signal to a primary signal at the receiver. The memory 1350 and computer program code are also configured, with the processor 1320, to cause the communication element 1310 to select a transmit signal power level for the interfering signal to fall within the interval of the received signal power levels at the receiver. The interfering signal and the primary signal may be transmitted on a same communication resource (e.g., including a frequency and time-slot communication resource).

In addition, program or code segments making up the various embodiments of the present invention may be stored in a computer readable medium or transmitted by a computer data signal embodied in a carrier wave, or a signal modulated by a carrier, over a transmission medium. For instance, a computer program product including a program code stored in a computer readable medium may form various embodiments of the present invention. The "computer readable medium" may include any medium that can store or transfer information. Examples of the computer readable medium include an electronic circuit, a semiconductor memory device, a read only memory ("ROM"), a flash memory, an erasable ROM ("EROM"), a floppy diskette, a compact disk ("CD")-ROM, an optical disk, a hard disk, a fiber optic medium, a radio frequency ("RF") link, and the like. The computer data signal may include any signal that can propagate over a transmission medium such as electronic communication network channels, optical fibers, air, electromagnetic links, RF links, and the like. The code segments may be downloaded via computer networks such as the Internet, Intranet, and the like.

As described above, the exemplary embodiment provides both a method and corresponding apparatus consisting of various modules providing functionality for performing the steps of the method. The modules may be implemented as hardware (embodied in one or more chips including an integrated circuit such as an application specific integrated circuit), or may be implemented as software or firmware for execution by a computer processor. In particular, in the case of firmware or software, the exemplary embodiment can be provided as a computer program product including a computer readable storage structure embodying computer program code (i.e., software or firmware) thereon for execution by the computer processor.

Although the present invention and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof. Also, many of the features, functions and steps of operating the same may be reordered, omitted, added, etc., and still fall within the broad scope of the present invention.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:
1. An apparatus, comprising:
   a processor; and
   memory including computer program code
   said memory and said computer program code configured, with said processor, to cause said apparatus to perform at least the following:
   identify an interval of received signal power levels for interference cancellation of an interfering signal to a primary signal; and generate a message that provides said interval of received signal power levels for said interference cancellation of said interfering signal to said primary signal.

2. The apparatus as recited in claim 1 wherein said memory and said computer program code are configured, with said processor, to cause said apparatus to identify a communication resource employed by another apparatus transmitting a signal with a received signal power level within said interval, and request an assignment of said communication resource to said apparatus.

3. The apparatus as recited in claim 1 wherein said memory and said computer program code are configured, with said processor, to cause said apparatus to determine a communication resource reservation limit and request an increase in said communication resource reservation limit.

4. The apparatus as recited in claim 1 wherein said memory and said computer program code are configured, with said processor, to identify said interval as a function of a modulation and coding scheme in accordance with said interfering signal.

5. The apparatus as recited in claim 1 wherein said memory and said computer program code are configured, with said processor, to cause said apparatus to perform interference cancellation of said interfering signal when said received signal power level is within said interval.

6. The apparatus as recited in claim 1 wherein said interfering signal and said primary signal are configured to be transmitted on a same communication resource.

7. An apparatus, comprising:
means for identifying an interval of received signal power levels for interference cancellation of an interfering signal to a primary signal; and
means for generating a message that provides said interval of received signal power levels for said interference cancellation of said interfering signal to said primary signal.

8. The apparatus as recited in claim 7, further comprising:
means for causing said apparatus to identify a communication resource employed by another apparatus transmitting a signal with a received signal power level within said interval; and
means for requesting an assignment of said communication resource to said apparatus.

9. A method, comprising:
identifying an interval of received signal power levels for interference cancellation of an interfering signal to a primary signal; and
generating a message that provides said interval of received signal power levels for said interference cancellation of said interfering signal to said primary signal.

10. The method recited in claim 9 further comprising requesting an assignment of a communication resource employable by a plurality of receivers.

11. The method as recited in claim 9, further comprising:
determining a communication resource reservation limit; and
requesting an increase in said communication resource reservation limit.

12. An apparatus, comprising:
a processor; and
memory including computer program code
said memory and said computer program code configured, with said processor, to cause said apparatus to perform at least the following:
receive a message that provides an interval of received signal power levels for interference cancellation of an interfering signal to a primary signal at a receiver; and
select a transmit signal power level for said interfering signal to fall within said interval of said received signal power levels at said receiver.

13. The apparatus as recited in claim 12 wherein said memory and said computer program code is further configured, with said processor, to cause said apparatus to perform at least the following:
receive a message from each of a plurality of receivers that provides an interval of received signal power levels for interference cancellation of an interfering signal to a primary signal at each of said plurality of receivers; and
select a transmit signal power level for said interfering signal to fall within said interval of said received signal power levels at each of said plurality of receivers.

14. The apparatus as recited in claim 12 wherein said memory and said computer program code are configured, with said processor, to cause said apparatus to provide a communication resource reservation limit and increase said communication resource reservation limit in response to said message that provides said interval of received signal power levels.

15. The apparatus as recited in claim 12 wherein said interval is a function of a modulation and coding scheme in accordance with said interfering signal.

16. The apparatus as recited in claim 12 wherein said interfering signal and said primary signal are configured to be transmitted on a same communication resource.

17. An apparatus, comprising:
means for receiving a message that provides an interval of received signal power levels for interference cancellation of an interfering signal to a primary signal at a receiver; and
selecting a transmit signal power level for said interfering signal to fall within said interval of said received signal power levels at said receiver.

18. The apparatus as recited in claim 17, further comprising:
means for receiving a message from each of a plurality of receivers that provides an interval of received signal power levels for interference cancellation of an interfering signal to a primary signal at each of said plurality of receivers; and
selecting a transmit signal power level for said interfering signal to fall within said interval of said received signal power levels at each of said plurality of receivers.

19. A method, comprising:
receiving a message that provides an interval of received signal power levels for interference cancellation of an interfering signal to a primary signal at a receiver; and
selecting a transmit signal power level for said interfering signal to fall within said interval of said received signal power levels at said receiver.

20. The method as recited in claim 19, further comprising:
receiving a message from each of a plurality of receivers that provides an interval of received signal power levels for interference cancellation of an interfering signal to a primary signal at each of said plurality of receivers;
selecting a transmit signal power level for said interfering signal to fall within said interval of said received signal power levels at each of said plurality of receivers; and
providing a communication resource reservation limit and increasing said communication resource reservation limit in response to said message that provides said interval of received signal power levels.

* * * * *